Sept. 15, 1959 L. B. TUCKER 2,904,347
SAFETY BELT FOR VEHICLE OCCUPANTS
Filed Sept. 1, 1955
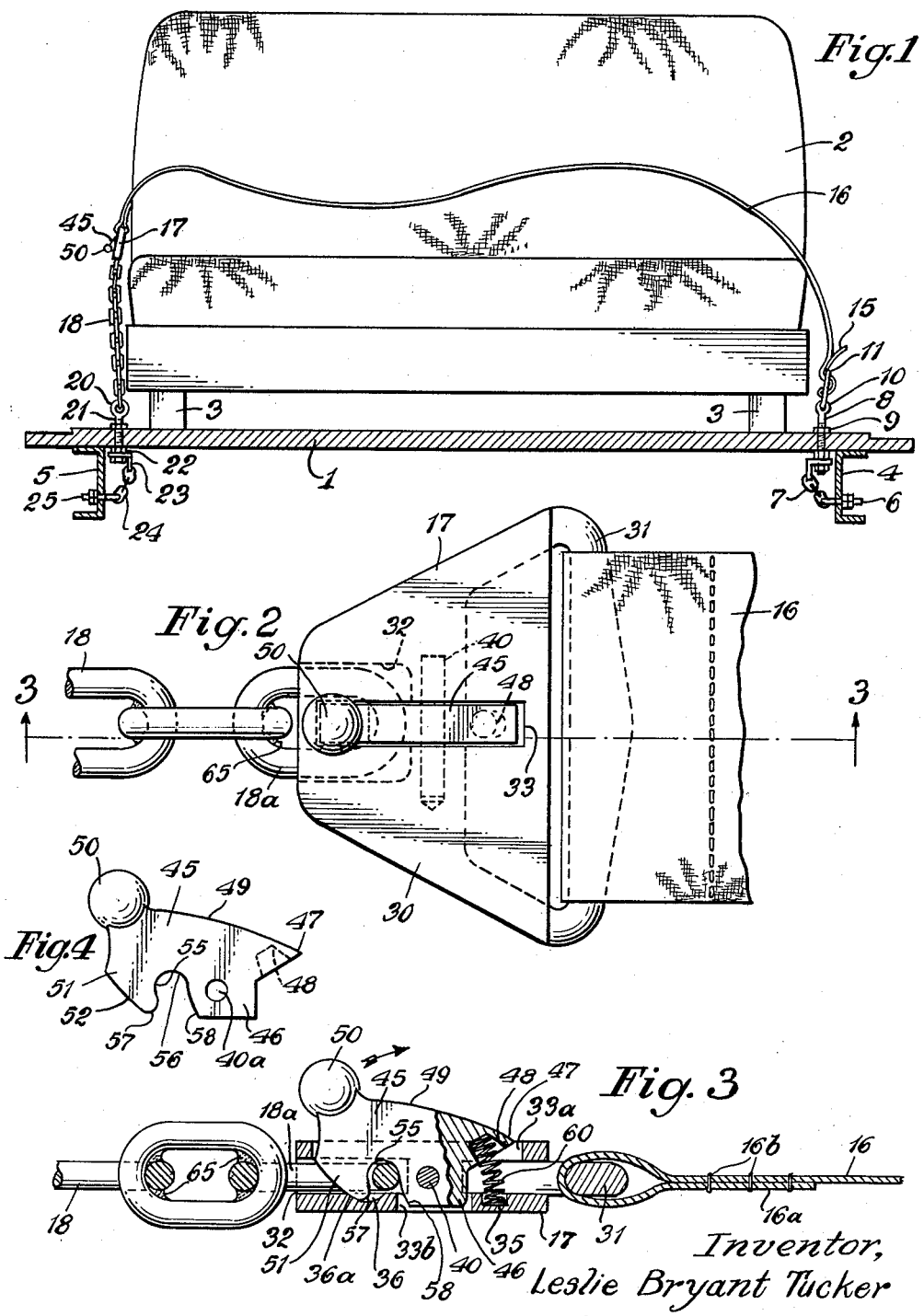
Inventor,
Leslie Bryant Tucker
by Parker & Carter
Attorneys

United States Patent Office

2,904,347
Patented Sept. 15, 1959

2,904,347

SAFETY BELT FOR VEHICLE OCCUPANTS

Leslie Bryant Tucker, Oak Park, Ill.

Application September 1, 1955, Serial No. 531,977

4 Claims. (Cl. 280—150)

This invention relates to safety belts and has particular relation to safety belts employed in association with vehicle seats.

One purpose is to provide a safety belt which shall be of one piece, extending entirely across a vehicle seat.

Another purpose is to provide a safety belt attachable to the frame of a vehicle and means for so attaching it.

Another purpose is to provide a particularly effective safety belt latch or buckle.

Another purpose is to provide a safety belt latch or buckle which shall be effective to hold the safety belt in place against a predetermined force.

Another purpose is to provide a safety belt latch or buckle wherein force tending to separate the safety belt from the member to which it is latched is employed to further seat the latch to resist such suspension.

Another purpose is to provide a safety belt latch or buckle which shall be of maximum strength and which shall, nonetheless, be easy and simple to operate.

Another purpose is to provide a safety belt assembly including a link chain to which a safety belt web portion may be latched or buckled.

Another purpose is to provide a safety belt assembly including a link chain, portions of which may be flexible, other portions of which may be generally rigid.

Other purposes will appear from time to time in the course of the specification and claims.

I illustrate my invention more or less diagrammatically in the accompanying drawings, wherein:

Figure 1 is a front view illustrating the safety belt of my invention installed in a vehicle;

Figure 2 is a top plan view, on an enlarged scale, of a portion of the safety belt assembly illustrated in Figure 1;

Figure 3 is a view in partial cross section taken on the line 3—3 of Figure 2; and Figure 4 is a detail view illustrating a latch member employed in my invention.

Like parts are indicated by like symbols throughout the specification and drawings.

Referring now to the drawings and particularly to Figure 1, the numeral 1 generally indicates the floor of a vehicle which may, for example, be an automobile. A vehicle seat, indicated generally by the numeral 2, may be secured to and supported on the floor 1 by the supports 3. The numerals 4, 5 are a pair of opposed, parallel vehicle frame members which may, for example, be channels.

Secured to the frame member 4 is a fastening means 6, which may be a bolt or other securing means. A short length of link chain 7 may be connected at one end to the bolt 6 and at its opposite end to a rod or bolt member 8 extending vertically through the floor 1 and secured thereto against vibration, as indicated generally at 9. The connecting member 8 may have an eye 10 at its upper end above the floor 1. A bracket or buckle 11 may be secured to the eye 10 and may have adjustably, frictionally connected thereto an end 15 of a safety belt web 16.

The safety belt or web 16 extends from the buckle 11 upwardly and across the seat 2 to a point adjacent the opposite side of the seat 2 from the member 8. The safety belt web 16 has at its opposite end a latch member 17. Engaged at one end with the member 17 is a link chain member 18. The chain 18 is connected at its opposite end to an eye 20 of a tension member or connecting member 21 which, like the member 8, extends vertically through the floor 1 and may be secured thereto against vibration, as indicated at 22. Connected to a downwardly extending end of the member 21, as at 23, is a short length of link chain 24 which is in turn connected to a fastener 25, secured to the vehicle frame member 5.

Referring now to Figures 2 and 3, I illustrate the member 17 and the upper two and one-half links of the chain 18 in securing relationship. The member 17 includes a relatively thick plate member 30. The plate member 30 has a rearwardly spaced, integral cross arm or yoke portion 31 about which an end 16a of the web 16 may be wrapped, the end 16a being secured to the web 16, as indicated generally at 16b in Figure 3. The plate or block member 30 has a forwardly open well or recess 32 formed to receive a major portion of a link 18a of the chain 18. A vertical slot 33 may be formed generally centrally in the block 30, the upper portion 33a of the slot 33 being substantially longer than the lower portion 33b thereof. A generally circular well 35 may be formed in the block 30 and upwardly open therefrom. As best seen in Figures 2 and 3, a well 35 is positioned rearwardly, considering the left-hand portion of the drawings as being the forward portion, of the slot portion 33b. Positioned forwardly of the slot portion 33B is a generally concave recess or well 36 lying in substantially the same plane as the well 35 and in alignment therewith. As best seen in Figure 2, a well 35, slot portions 33a, 33b, well 36, and forwardly open recess 31 are all in alignment and positioned generally centrally of the block 30.

A pivot pin 40 may have its opposite ends secured within the block 30 and generally centrally thereof. As best seen in Figure 2, the pin 40 has its central portion extending perpendicular to and through the slot 33 at a point generally intermediate the upper and lower surfaces of the block 30.

Pivotally mounted on the pin 40 is a latch element 45. The latch element 45 has a generally central portion 46 through which the pin 40 extends. A rearwardly-disposed upwardly-inclined, projecting portion 47 of the element 45 has a downwardly open well 48 formed therein, the purpose of which will appear hereinbelow. Positioned along the upper edge 49 of the element 45, forwardly of the portion 46, is a manually-operable, spherically-shaped handle portion 50. Beneath the handle portion 50, the element 45 has a hook portion, generally indicated by the numeral 51. The hook portion 51 has a forward, rearwardly and downwardly inclined, as the parts are shown in Figures 3 and 4, edge 52. Between the edge 52 and the pin or shaft opening 40a in the portion 56 and in alignment therewith is a chain-receiving, latching slot 55. The slot 55 has an inner concave surface 56. A reversed-curve convex forward edge 57 and a generally smoothly, rearwardly inclined rear edge or side wall 58. As best seen in Figure 4, the portion 55 lies in a plane generally between those occupied by the element 50 and the pin-receiving opening 40a.

As best seen in Figure 3, a yielding member, such as the spring 60, may have one of its ends seated in the well 35 and its opposite end seated in the well 48.

In order to provide rigidity to a portion of the chain 18, I find it advantageous to weld some of the links thereof together, as indicated generally at 65 in the left-hand portion of Figure 3. For example, I may weld together the upper or outer two or three links of the chain 18 to permit the user to grab the second or third link and yet to control adequately the movement of the outermost chain link into the recess or slot 32.

It will be realized that, whereas I have described and illustrated a practical and operative device, nevertheless, many changes may be made in the size, shape, number and disposition of parts without departing from the spirit of my invention. I therefore wish my description and drawings to be taken as, in a broad sense illustrative or diagrammatic, rather than as limiting me to my precise showing.

For example, while Figure 1 shows the strap 16 extending across a single seat, it will be realized that my invention encompasses an arrangement wherein a pair of flexible chains 18 could be connected to a central frame member of a vehicle and could extend upwardly to approximately the center of the vehicle seat and a pair of straps could extend from opposite sides of the seat for connection, each with one of said chains. Such an arrangement would, of course, be advantageous with relation to the front seat of an automobile wherein the driver may be the only occupant.

The use and operation of my invention are as follows:

After my invention has been installed in the manner shown in Figure 1, the user, after having alighted on the seat 2, merely grasps the element 17 in one hand and one of the outermost links in the chain 18 in the other hand. When some of the links 18 are welded together, the user may grab any of the outermost links so secured and yet be able to easily and simply direct the outermost link in the well 32. As the link 18a, for example, enters the well 32, its forward curved edge is brought into contact with the forward edge 52 of the latch element 45. Continued movement of the link 18a into the well 32 because of the inclination of the edge 52 forces the latch element 45 to rotate in a clockwise direction, as the parts are shown in the drawings, about the pivot pin 40 toward non-latching position. It will be realized that the pin 40 is not relied upon to maintain latching engagement between the element 45 and the link 18a and, therefore, need not be of substantial strength. The spring 60 is, therefore, easily overcome by movement of the link 18a into the recess 31 and against and along the edge 52 of the element 45. As soon as the forward curved portion of the link 18a passes the edge 57 and comes into general alignment with the latching slot 55, the spring 60 is effective to rapidly return or "snap" the latch element 45 into the latching position illustrated in Figure 3. The spring 60 urges the latch element 45 in a counterclockwise direction toward said latching position.

When the latch element 45 is thus moved into latching position, a nose portion, represented by the edges 52, 57, is directed downwardly into the well 36, as best seen in Figure 3. Thereafter, force tending to pull the link 18a outwardly from the well 31 brings the inner curved edge of the forward portion of the link 18a into contact with a forward portion of the concave wall 56 of the slot 55. This force is, in turn, resisted by the engagement of the pin 40 with the latch element 45 and the engagement of part of the forward edge 52 of the latch element 45 with the forward concave or inclined surface of the well 36, as indicated at 36a.

Should an accident occur in which the vehicle is suddenly stopped, momentum carrying the passenger forwardly or partly against the belt 16, the force thereof is transmitted through the chain 18 and buckle 11, tension members 8 and 20, chains 7 and 24, and connectors 6 and 25 to the automobile frame members 4, 5.

I claim:

1. In a safety belt assembly for vehicles and the like, a strap of flexible material, means at one end of said strap for adjustably securing the same to said vehicle, a latch member secured to the opposite end of said strap, a flexible chain secured at one end to said vehicle and having a link member at its opposite end, said latch member having an opening formed and adapted to receive said link member, a latch element pivotally mounted on said latch member and yielding means positioned on said latch member to urge said latch element into latching engagement with said link when said link is within said opening, said link being fixedly secured to an adjacent link of said chain.

2. In a safety belt assembly, a flexible strap, a latch member secured to one end of said strap, a flexible chain, said latch member having an opening positioned to receive a link of said chain, a latch element pivotally mounted on said latch member for rotation about a pivot, said latch element having a latching portion, yielding means for urging said latching portion into engagement with said link, said latching portion having a link-engaging surface lying in an arc about said pivot and a manual operating portion on said latch element, said operating portion being positioned beyond said latching portion from said pivot.

3. In a safety belt assembly for vehicles and the like, a strap of flexible material, means at one end of said strap for adjustably securing the same to said vehicle, a latch member secured to the opposite end of said strap, a flexible chain secured at one end to said vehicle and having a link member at its opposite end, said latch member having an opening formed and adapted to receive said link member, a latch element pivotally mounted on said latch member and yielding means positioned on said latch member to urge said latch element into latching engagement with said link when said link is within said opening, at least the two links of said chain at its end opposite to that secured to said vehicle being fixedly secured to each other to prevent relative movement therebetween.

4. In a safety belt assembly a pair of elongated flexible members, one of said members having a link at one end thereof, a latch member secured to one end of the other of said elongated members and having an opening positioned to receive said link, a latch element pivotally mounted on said latch member for rotation about a pivot, said latch element having a latching portion, yielding means for urging said latching portion into engagement with said link, said latching portion having a link engaging-surface lying in an arc about said pivot and a manual operating portion on said latch element, said operating portion being positioned beyond said latching portion from said pivot.

References Cited in the file of this patent

UNITED STATES PATENTS

| 256,087 | Wiesenmeyer | Apr. 4, 1882 |
| 332,053 | Cole | Dec. 8, 1885 |
| 804,678 | Satchwell | Nov. 14, 1905 |
| 2,275,450 | Manson | Mar. 10, 1942 |
| 2,280,694 | Embree et al. | Apr. 21, 1942 |
| 2,454,794 | Hakanson | Nov. 30, 1948 |
| 2,689,604 | Hourruitiner | Sept. 21, 1954 |
| 2,716,561 | Beran | Aug. 30, 1955 |

FOREIGN PATENTS

| 700,743 | France | Jan. 2, 1931 |